United States Patent [19]

Costello et al.

[11] Patent Number: 5,737,469

[45] Date of Patent: Apr. 7, 1998

[54] FILLING COMPOUND FOR FIBER OPTICAL CABLES

[75] Inventors: Michael Costello, Hewitt; Anna Debska-Chwaja, Suffern, both of N.J.; Alan Eckard, Chester, N.Y.; William Thalman, Denville, N.J.

[73] Assignee: Witco Corporation, Greenwich, Conn.

[21] Appl. No.: 659,031

[22] Filed: Jun. 3, 1996

[51] Int. Cl.$^6$ .................................................. G02B 6/44
[52] U.S. Cl. ........................... 385/109; 385/141; 523/173
[58] Field of Search .................................. 385/100, 102, 385/106, 109, 110, 111, 112, 113, 141; 523/173

[56] References Cited

U.S. PATENT DOCUMENTS

| | | | |
|---|---|---|---|
| 4,639,483 | 1/1987 | Billigmeier et al. | 523/173 X |
| 5,187,763 | 2/1993 | Tu | 385/100 |
| 5,285,513 | 2/1994 | Kaufman et al. | 385/109 |

*Primary Examiner*—John D. Lee
*Attorney, Agent, or Firm*—Scully, Scott, Murphy & Presser

[57] ABSTRACT

Disclosed are hydrophobic compositions useful for filling the voids within jacketed optical fiber cables. The compositions include about 85 to 95 parts by weight of mineral oil, 5 to 15 parts by weight of a (styrene)-(ethylene/propylene) diblock copolymer having a styrene: (ethylene/propylene) ratio of 37.5:62.5 to 27.5:72.5 and a specific gravity of about 0.90 to 0.95, optional antioxidant, and optional metal deactivator.

2 Claims, No Drawings

FILLING COMPOUND FOR FIBER OPTICAL CABLES

BACKGROUND OF THE INVENTION

The present invention relates to fiber optic cables incorporating a unique composition which protects the signal-carrying components of the cable from damage during manufacture, installation and use. The present invention relates more particularly to the unique composition which imparts the desirable protective properties described herein to the fiber optical cable.

Generally, in optical fiber cables a plurality of optical fibers (generally about 100) are enclosed together in an extruded plastic tube, often referred to as a "buffer tube". A plurality of these units, generally about 6–50, are enclosed in a common extruded plastic tube-like sheath. Even in the most compact of manufactures, there are usually voids between the optical fibers inside the buffer tube. The present invention relates particularly to a filling compound that can be filled into the voids inside the buffer tube.

Optical fiber cables are subject to various stresses and shocks during manufacture, installation and use, any of which poses a risk of damage to the signal-carrying conductors within the cable. Such events can include stretching or compression of the conductors; compression of one or more of the conductors against the jacket; fracture of all or a portion of a conductor; and cracking or perforation of the jacket such that water can penetrate and disturb the functioning of the conductors.

Accordingly, it has been proposed to incorporate a filler material within the cable, to fill the voids between the conductors and between the conductors and the interior surface of the buffer tube. Such a filler material should desirably afford protection to the conductors against physical dislocation and damage, while remaining sufficiently flexible that the cable can be used in any conventional manner in which it is used during manufacture, installation and use. Such a filler material should also protect against the incursion of water in the event that water is able to penetrate within the jacket.

The identification of a completely satisfactory cable filler composition has not been simple. In particular, such a composition must be sufficiently fluid that it can readily be fed into the interior of the cable during manufacture, and should also be sufficiently flexible that the cable can be coiled or bent in the manner to which it may be exposed particularly during manufacture and installation. The filler composition must not be so fluid that it flows out of the cable, through the cut ends thereof or through punctures or cracks in the buffer tube that may occur. In addition, since filler compositions are usually mixtures of materials, it is highly desirable that the filler composition would resist any tendency of the several components to separate one from the other, even on exposure to any of the wide range of physical challenges and environmental conditions to which the cable may be subjected.

Examples of cable filler systems which have been disclosed in the past include mixtures of oil with a colloidal gelling agent such as fumed silica, together with an amount of a copolymer such as a styrene-rubber or styrene-rubber-styrene block copolymer. Examples are disclosed in U.S. Pat. No. 4,971,419, U.S. Pat. No. 5,285,513 and U.S. Pat. No. 5,358,664, the last of which discloses compositions incorporating an aluminum-complex soap. It would be desirable to be able to identify satisfactory filler compositions useful in fiber optical cables, which exhibit the desirable properties described herein better than existing filler compositions. It would also be useful if such a filler composition does not require a distinct inorganic gelling agent such as those described in the aforementioned patents.

SUMMARY OF THE INVENTION

The present invention satisfies the objectives described herein, and exhibits as well the additional features and advantages which are described herein.

The present invention comprises in one aspect a composition which is useful as a filling material for substantially filling the voids between fibers in a fiber optical cable, wherein the filling material consists essentially of (a) 85 to 95 parts by weight of oil selected from the group consisting of (a1) naphthenic mineral oils comprising 45 to 50 wt. % naphthenics and the balance paraffins, exhibiting a viscosity at 40° C. of 19 to 66 centistokes, a viscosity at 100° C. of 3.5 to 7.5 centistokes, a viscosity index of 40 to 65, a specific gravity at 15.6° C. of 0.87 to 0.90, a pour point of $-45°$ F. to $-25°$ F., and an average molecular weight of 310 to 400; and (a2) poly-alphaolefins and mixtures thereof, exhibiting a viscosity at 40° C. of 15 to 400 centistokes, a viscosity at 100° C. of 1 to 40 centistokes, a viscosity index of 120 to 160, specific gravity at 15.6° C. of 0.79 to 0.84, and a pour point of $-100°$ F. to $-50°$ F.

(b) 5 to 15 parts by weight of a (styrene)-(ethylene/propylene) diblock copolymer having a styrene: (ethylene/propylene) ratio of 0.55 to 0.65 and a specific gravity of about 0.90 to 0.95;

(c) optional antioxidant in an amount if present up to 2 parts by weight; and (d) optional metal deactivator in an amount if present up to 0.1 part by weight.

Another aspect of the invention is a cable comprising a plurality of conductors contained within a jacket, leaving voids between the conductors and the jackets, wherein said filling material is present substantially filling the voids.

DETAILED DESCRIPTION OF THE INVENTION

The components of the cable other than the filler composition described in more detail herein, include any of those conventionally employed in the optical fiber cable industry. Generally speaking, the cable comprises several individual signal-carrying fibers, encased together in a buffer tube which is preferably composed of thermoplastic polymer and is preferably of a unitary, seamless, construction. Means are known in this art for continuously extruding such buffer tubes while simultaneously incorporating within the buffer tube the desired optical fiber conductors and the filing composition.

The conductors themselves can comprise a plurality of longitudinal filaments, each of which can be single fiber or can be composed of subunits wherein a plurality of conductors are bound together or are even encased within their own jacket, within the cable itself.

The filler composition of the present invention exhibits a number of satisfactory properties, including the following:

It performs well and remains flexible and homogeneous over the range of temperatures from $-40°$ C. to 80° C.;

It is free of syneresis (bleeding of its oil component) over the same temperature range;

It is able to yield and recover under the strains which are experienced when cable is manufactured and handled;

It is thermally stable and oxidatively stable;

It is not affected adversely by water, and prevents incursion of water into the cable;

It is compatible with the material of the buffer tube and any other materials of construction of the cable;

It is economical, safe, and compatible with existing equipment used in this field.

One component of the filling material of the present invention is oil. The oil is preferably present in an amount corresponding to 85–95 parts by weight of the filling material. The oil should have the following characteristics.

Among the preferred oils are naphthenic mineral oils. These are a commercially recognized type of product which generally contain 45 to 50 wt. % naphthenics and the balance paraffins. Generally, the naphthenic mineral oils useful in this invention exhibit the following properties set forth in Table 1:

TABLE 1

| Property | Preferred Range |
| --- | --- |
| Viscosity, 40° C. (ASTM D-445) | 19 to 66 centistokes (cSt) |
| Viscosity, 40° C. (ASTM D-445) | 3.5 to 7.5 cSt |
| Viscosity index (ASTM D-2270) | 40 to 65 |
| Specific gravity, 15.6° C. (ASTM D-1298) | 0.87 to 0.90 |
| Pour point (ASTM D-97) | −45° F. to −25° F. |
| Average molecular weight | 310 to 400. |

Preferred examples of naphthenic mineral oils include those sold by Witco Corp. as "LP 100", "LP 150", "LP 200", "LP 250", "LP 300" and "LP 350".

Other preferred oils useful in the present invention are poly-(alpha olefins) having properties which lie in the ranges set forth in Table 2:

TABLE 2

| Property | Preferred Range |
| --- | --- |
| Viscosity, 40° C. (ASTM D-445) | 15 to 400 cSt |
| Viscosity, 100° C. (ASTM D-445) | 1 to 40 cSt |
| Viscosity index (ASTM D-2270) | 120 to 160 |
| Specific gravity, 15.6° C. (ASTM D-1298) | 0.79 to 0.84 |
| Pour point | −100° F. to −50° F. |

As used herein, the term "poly-alphaolefins" encompasses polymers and copolymers of alkenes and mixtures of alkenes, including ethylene, propylene, butene, 1-decene, 1-dodecene, and the like. Also included are such polymers which have been partially hydrogenated.

Numerous poly-alphaolefins are commercially available which satisfy these criteria. Among them are the products known as "Synfluid PAO" (Chevron), particularly those known as the 2 cSt, 4 cSt, 6 cSt, and 8 cSt grades. Others include those sold by Mobil under the "SHF" mark, such as "SHF-61", a low viscosity hydrogenated poly-alphaolefin, "SHF-62", "SHF-82", "SHF-401", and "SHF-1001".

The filling material of the present invention also includes 5 to 15 parts by weight of a (styrene)-(ethylene/propylene) diblock copolymer. A preferred diblock copolymer has a mole ratio of styrene to (ethylene/propylene) rubber in the range of about 37.5:62.5 to about 27.5:72.5. The preferred diblock copolymer also exhibits a specific gravity of about 0.90 to 0.925 and a shore A hardness of 70 to 75.

A preferred copolymer exhibiting these characteristics and useful in the present invention is the product sold by Shell Chemical Company under the trade name "KRATON G1701", a styrene-(ethylene/propylene) block copolymer, unplasticized, which exhibits a styrene: (ethylene/propylene) ratio of about 37:63, a Shore A hardness of 72, a specific gravity of about 0.92, and a break strength of 300 psi (as determined by ASTM test D-412).

Another preferred copolymer is sold by Shell under the name "KRATON G1702". It is a styrene-(ethylene/propylene) block copolymer, unplasticized, which exhibits a styrene:(ethylene/propylene) ratio of about 28:72, a Shore A hardness of 75, a specific gravity of about 0.91, and a break strength of 300 psi (ASTM D-412).

The filling material does not need to include any additional gelling component or "antibleed" component, while providing very satisfactory performance in the intended environment with an optical fiber cable. If desired, though, another gelling compound such as fumed silica is optionally included as well. However, one may optionally include one or more antioxidants, and one may also optionally include a metal deactivator. An antioxidant component, if present, is used in a small but effective amount which is generally on the order of up to about 2 parts by weight. Examples of suitable antioxidants include phenolic-based and phosphite-based antioxidants. Examples are plentiful and are well known in the field of polymer formulations. Specific examples include "Irganox 1010", "Irganox 1076", "Irganox 1035", (Ciba-Geigy) and "Mark 2112", "Mark 1500", and "Mark 5014" (Witco).

A metal deactivator, if present, is used in a small but effective amount generally on the order of up to about 0.1 part by weight of the filling material. Examples of suitable metal deactivators include "Reomel 39 LF" and other commercially available products known in this field.

The filling material of the present invention is readily prepared by combining the mineral oil and the diblock copolymer in the indicated amounts, together with antioxidant and/or metal deactivator if desired, and stirring the materials together thoroughly until a homogeneous liquid is formed. If desired, gentle heating can be applied to assist the formation of the desired completely homogeneous composition. In a preferred procedure, the components are mixed together at low shear at 25° C. The mixture is then heated to 120°–130° C., until the polymer is completely dissolved in the oil. The blend is then cooled to 25° C. under vacuum to remove any entrapped air bubbles.

The resulting composition is then fed into the buffer tube, preferably at the point that the cable is being manufactured, all by procedures well known in this field.

The benefits and superior performance of the present invention are described further in the following examples. These examples are included for purposes of illustration and are not intended to limit the scope of that which is regarded as the invention.

EXAMPLES

Formulations were made by combining oil and styrene-(ethylene/propylene) diblock copolymer ("Kraton G 1701") in a mixer for several hours at 130° C. The samples were then cooled and centrifuged at moderate speed to remove any entrapped air.

The rheological properties of the gels which resulted were studied with a Brookfield Model RVF Viscometer with a #7 spindle at 22° C. and 55% humidity according to ASTM D1824 (which recommends 23°±1° C. and 50±5% humidity). Each sample was sheared for two minutes at four different rotations (2, 4, 10, and 20 rpm, which corresponds to shear rates of 0.1, 0.05, 0.02, and 0.01 $sec^{-1}$, respectively). In order to evaluate the handling characteristics of the samples the apparent viscosities were measured and the following criteria were calculated: shear thinning index, degree of thixotropy, and thixotropy index. These criteria, which are defined below, were calculated as recommended by ASTM 2196 with one modification. The apparent viscosities measured in consideration for the shear thinning index evaluation were made at 2 and 10 rpm, whereas the method specifies typical combinations of speeds at 2 and 20 rpm.

As defined by ASTM D2196, the shear thinning index is the ratio between the viscosity at 2 rpm to the viscosity at 10 rpm. The degree of thixotropy is a ratio of the viscosity at 2 rpm, taken with increasing speed to that with decreasing physical properties of the resulting gel. In all cases the gels exhibited properties showing that they are very satisfactory cable fillers.

TABLE 4

| Sample | 1 | 2 | 3 | 4 | 5 | 6 | 7 | 8 | 9 | 10 | 11 |
|---|---|---|---|---|---|---|---|---|---|---|---|
| Oil | C | D | E | F | B | B | B | A | A | A | A |
| % Kraton G1701 | 9 | 9 | 12 | 15 | 9 | 11 | 12 | 9.2 | 12 | 13 | 15 |
| Appearance | s. hazy | s. hazy | hazy | hazy | clear | clear | clear | clear | clear | clear | clear |
| Cone Penetrations (dmm) | | | | | | | | | | | |
| −60 C. | 253 | 77 | 120 | 77 | 93 | 82 | 77 | 159 | 142 | 139 | 108 |
| −40 C. | 299 | 297 | 221 | 186 | 202 | 185 | 186 | 229 | 206 | 195 | 170 |
| −20 C. | 333 | 333 | 276 | 250 | 272 | 260 | 231 | 310 | 268 | 261 | 225 |
| 0 C. | 349 | 336 | 305 | 305 | 333 | 233 | 376 | 349 | 324 | 320 | 298 |
| +21 C. | 359 | 357 | 329 | 290 | 340 | 354 | 349 | 383 | 340 | 346 | 319 |
| Oil Sep, 48 h, 80 C., % | 0.0 | 0.1 | 0.2 | 0.4 | 0.2 | 0.2 | 0.2 | 12.8 | 2.2 | 0.3 | 0.2 |
| Volatility, 48 h, 80 C., % | 0.1 | 0.2 | 0.2 | 0.3 | 0.2 | 0.2 | 0.2 | 0.9 | 0.4 | 0.3 | 0.2 |
| Shear Thinning Index | 3.4 | 3.3 | 3.0 | 2.3 | 2.5 | 2.3 | 2.3 | 2.3 | 2.3 | 2.4 | 2.4 |
| Degree of Thixotropy | 1.0 | 1.0 | 1.0 | 0.9 | 1.0 | 1.0 | 0.9 | 0.9 | 0.9 | 1.0 | 0.9 |
| Thixotropy Index | 1.0 | 1.0 | 1.0 | 1.0 | 1.0 | 1.1 | 1.0 | 1.0 | 1.0 | 1.0 | 1.0 |
| Viscosity, cps (2 rpm) | 200000 | 200000 | 381667 | 425000 | 205000 | 370000 | 436667 | 175000 | 266667 | 511667 | 758333 |
| Viscosity, cps (10 rpm) | 58500 | 60500 | 125500 | 178500 | 81500 | 143200 | 192000 | 76000 | 112500 | 209000 | 316000 | speed. The thixotropy index is the ratio of the viscosity at 2 rpm taken after a rest period of 30 minutes to that before the rest period.

The volatility test was conducted at 80° C. and aged for 48 hours. The volatilities were measured by comparing the weight loss of the filling compound before and after the aging. The oil separation test was conducted according to FED 791 at 80° C. for 48 hours. The cone penetration values were determined by ASTM D937, with a 150 gram weight.

The oils used are described in Table 3:

TABLE 3

| | Oil | | | | | |
|---|---|---|---|---|---|---|
| Property | A | B | C | D | E | F |
| Viscosity, 40° C. (cst) | 19.5 | 37.5 | 16.9 | 23.9 | 47. | 400. |
| Viscosity, 100° C. (cSt) | 3.6 | 5.4 | 3.9 | 5.1 | 7.8 | 40. |
| Viscosity Index | 40. | 53.9 | 123. | 145. | 135. | 152. |
| Pour Point, °C. | −40. | −37. | −73. | −48. | −54. | −40. |
| Flash Point, °C. | 170. | 190. | 219. | 238. | 246. | 275. |
| Color Saybolt | +30. | +30. | +30. | +30. | +30. | +30. |

Oils A and B were commercial naphthenic mineral oils, sold under the names "LP 100" and "LP 200" (Witco), respectively. Oils C, D, E and F were commercial poly-alphaolefin oils.

Table 4 shows for each sample the identity of the oil, the amount of diblock copolymer gelling agent present, and the

What is claimed is:

1. A composition useful as a filling material for substantially filling voids between fiber optical conductors in a fiber optic cable, wherein the filling material does not include an inorganic gelling agent and consists essentially of
   (a) 85 to 95 parts by weight of oil selected from the group consisting of
      (a1) naphthenic mineral oils comprising 45 to 50 wt. % naphthenics and the balance paraffins, exhibiting a viscosity at 40° C. of 19 to 66 centistokes, a viscosity at 100° C. of 3.5 to 7.5 centistokes, a viscosity index of 40 to 65, a specific gravity at 15.6° C. of 0.87 to 0.90, a pour point of −45° F. to −25° F., and an average molecular weight of 310 to 400; and
      (a2) poly-alphaolefins and mixtures thereof, exhibiting a viscosity at 40° C. of 15 to 400 centistokes, a viscosity at 100° C. of 1 to 40 centistokes, a viscosity index of 120 to 160, specific gravity at 15.6° C. of 0.79 to 0.84, and a pour point of −100° F. to −50° F.;
   (b) 5 to 15 parts by weight of a (styrene)-(ethylene/propylene) diblock copolymer having a styrene: (ethylene/propylene) ratio of 37.5:62.5 to 27.5:72.5, a Shore A hardness of 70 to 75 and a specific gravity of about 0.90 to 0.95;
   (c) an optional antioxidant component in an amount if present up to 2 parts by weight; and
   (d) optional metal deactivator in an amount if present up to 0.1 part by weight.

2. A cable comprising a plurality of conductors contained within a jacket leaving voids between the conductors and the jacket, and a filling material according to claim 1 substantially filling said voids.

* * * * *